United States Patent
Monkman et al.

(10) Patent No.: US 9,157,661 B2
(45) Date of Patent: Oct. 13, 2015

(54) SERVICE DEVICE FOR MAINTENANCE OF A SOLAR PANEL ARRANGEMENT

(75) Inventors: Gareth Monkman, Regensburg (DE); Christian Baar, Oberndorf am Lech (DE); Arthur Fischer, Regensburg (DE); Stefan Jaeger, Unterschleiβheim (DE); Sebastian Kilbertus, Tegernheim (DE); Adrian Patzak, Regensburg (DE); Michael Schumm, Hirschaid (DE); Daniel Treiber, Loitzendorf (DE)

(73) Assignee: Crowd IP Box UG, Pullach (DE)

( * ) Notice: Subject to any disclaimer, the term of this patent is extended or adjusted under 35 U.S.C. 154(b) by 960 days.

(21) Appl. No.: 13/208,426

(22) Filed: Aug. 12, 2011

(65) Prior Publication Data
US 2012/0125367 A1  May 24, 2012

(30) Foreign Application Priority Data
Oct. 1, 2010  (EP) .................................. 10012717

(51) Int. Cl.
| | |
|---|---|
| *B08B 1/00* | (2006.01) |
| *F24J 2/46* | (2006.01) |
| *B08B 1/04* | (2006.01) |
| *A46B 7/10* | (2006.01) |
| *A46B 13/00* | (2006.01) |

(52) U.S. Cl.
CPC .................. *F24J 2/461* (2013.01); *B08B 1/008* (2013.01); *B08B 1/04* (2013.01); *A46B 7/10* (2013.01); *A46B 13/001* (2013.01); *A46B 2200/3073* (2013.01); *Y02E 10/40* (2013.01)

(58) Field of Classification Search
CPC ............ B08B 3/04; B08B 3/08; B08B 11/00; A47L 1/00; A47L 1/02; Y02B 10/10; Y02B 10/20
See application file for complete search history.

(56) References Cited

U.S. PATENT DOCUMENTS

| 5,323,508 A | 6/1994 | Sheldrake |
|---|---|---|
| 2010/0000570 A1 | 1/2010 | Mertins et al. |

FOREIGN PATENT DOCUMENTS

| DE | 202006003697 U1 | 5/2006 |
|---|---|---|
| DE | 102006053704 A1 | 5/2008 |
| EP | 0538521 A1 | 4/1993 |
| EP | 2048455 A2 | 4/2009 |
| WO | 2008058528 A1 | 5/2008 |
| WO | WO2009/061046 * | 5/2009 |

OTHER PUBLICATIONS

European Search Report Dated Apr. 11, 2011 for European Application No. 10012717.4-2301. 7 Pages.

* cited by examiner

*Primary Examiner* — Michael Kornakov
*Assistant Examiner* — Ryan Coleman
(74) *Attorney, Agent, or Firm* — Michael J. Feigin, Esq.; Feigin & Associates, LLC

(57) ABSTRACT

The invention relates to a service device for maintenance of a solar panel arrangement, comprising a service unit for maintenance of at least one surface of the solar panel arrangement, a guiding unit for guiding the service unit with respect to the solar panel arrangement, and a driving unit for moving the service unit with respect to the solar panel arrangement, wherein the service unit comprises a first engagement section and a second engagement section, wherein the guiding unit is attachable to the first engagement section, the guiding unit being configured for direct engagement with an edge of the solar panel arrangement, wherein the driving unit is attachable to the second engagement section, and wherein the second engagement section is displaceable with respect to the first engagement section by the driving unit.

13 Claims, 6 Drawing Sheets

SERVICE DEVICE FOR MAINTENANCE OF A SOLAR PANEL ARRANGEMENT

REFERENCE TO RELATED APPLICATION

This application claims priority to European Patent Application No. 10012717.4-2301, filed on Oct. 1, 2010.

BACKGROUND

The invention relates to a service device for maintenance of a solar panel arrangement and a method for cleaning an inclined surface of a solar panel arrangement.

In the last years, the use of solar panels for the collection of solar energy and conversion into electrical energy has become a common practice. In solar power plants, large numbers of solar panels are mounted on supporting carriers and disposed in an array-like arrangement, usually forming long rows of solar panels neighbouring each other. In order to maximize the yield of collected solar energy, surfaces of the solar panels are aligned towards the sun and therefore inclined with respect to the horizontal. The angle of inclination may be kept fixed during the day, keeping the solar panels in an overall preferred position, or may be maintained in order to follow the sun. Contamination of the solar panel surfaces with dust, sand, snow, leaves and branches of plants, and other residues due to environmental influences are a known problem, causing reduction of the gained electrical energy. Therefore, periodic cleaning of the panel surfaces is necessary in order to achieve a high level of energy production. Besides this, there is further need for maintenance of solar panels especially in solar power plants, e.g. periodic examination of the panels for mechanical or electrical defects. However, manual maintenance like cleaning or examination of a large number of solar panels is costly in terms of time and labour. Furthermore, manual cleaning of solar panel surfaces is tedious work accompanied by physical exhaustion and inattentiveness of the workforce, eventually leading to fluctuations in terms of cleaning and inspection quality.

WO 2008 058 528 A1 describes a washing apparatus for cleaning of solar collectors and solar panels. The washing apparatus comprises an arc-shaped, stiff housing, inside which washing nozzles and brushes are arranged for cleaning a collecting surface of a solar collector. In use, the washing apparatus is mounted from above onto the collecting surface. The washing apparatus housing embraces the solar collector in its edge regions in such a way, that the washing apparatus is guided in a longitudinally movable manner directly on the solar collector. For that purpose, the housing comprises first rollers engaging with the surface to be cleaned and having a rolling axis parallel to the surface as well as second rollers engaging with the edge of the surface and having a rolling axis being perpendicular to the rolling axis of the first rollers. A disadvantage of the described washing apparatus is that due to embracement of the solar panel edges by the housing, the apparatus may be mounted or dismounted to rows of solar collectors only at free ends of the rows, rendering it impossible to mount or dismount the apparatus at arbitrary positions. A further disadvantage is that large masses of pollutants like snow or leaves cannot be handled by the washing apparatus due to the fact that all cleaning takes place in the confined space inside the housing of the apparatus. A further disadvantage with respect to solar panels is that parts of the housing encompass the edges of the surface to be cleaned and therefore may touch the sensitive backsides of solar panels, leading to serious damage of the solar panels.

EP 2 048 455 A2 describes an automatic cleaning system for solar panels. The system comprises longitudinal guiding rails being fixed to a supporting structure of the solar panels and being disposed on opposite sides of the solar panel arrangement to be cleaned. The system comprises further a cleaning brush being disposed orthogonally with respect to the guiding rails. Driving units are provided at both guiding rails for moving the cleaning brush along the guiding rails, thus cleaning the solar panel surfaces. A disadvantage of the described system is that separate, fixedly mounted guiding rails are necessary and that the cleaning brush is fixedly joined to the guiding rails. Accordingly, in a solar power plant comprising a large number of solar panel arrangements, an accordingly large number of guiding rails, driving units and cleaning brushes are necessary for cleaning of all solar panels, leading to high investment costs. Besides cleaning, no further maintenance is feasible with the described system.

EP 0 538 521 A1 describes a cleaning system for roof glazings. The system is designed for the cleaning of atrium-like glazings comprising triangular and trapezium shaped surfaces and pyramid like structures. The cleaning system comprises a first guiding reel being arranged above the glazing surface to be cleaned and a second guiding reel being arranged below the glazing. An extensible brush for cleaning the glazing is guided between the first guiding reel and the second guiding reel. Driving units for driving a corresponding end of the brush along the guiding reel are assigned to each guiding rail. In order to clean e.g. a trapezium shaped window, the window region to be cleaned may be partitioned into a rectangular section and one or two triangular sections. In order to clean the rectangular section, both ends of the brush are driven along the guiding rails in such a way that the brush is oriented perpendicular with respect to the guiding rails. In order to clean a triangular section, one of the ends of the extensible brush is kept in a fixed position, while the other end is driven along the corresponding guiding rail in order to cover the triangular surface. During this movement, the extensible brush changes its length. A disadvantage of the described system is that it comprises fixedly mounted guiding rails and that the cleaning brush is permanently joined to the guiding rails.

DE 10 2006 053 704 A1 considered to be the closest prior art describes a device for maintenance of a solar panel arrangement, comprising a service unit for maintenance of the solar panel arrangement, the service unit bridging the complete width of the solar panel and covering it with a housing. A guiding unit is provided at opposite ends of the housing, each guiding unit being configured as longitudinal groove of the housing extending along the solar panel arrangement and engaging the edge and a rear side of the solar panel arrangement. The service unit comprises a driving unit for moving the service unit along the solar panel arrangement.

SUMMARY

It is an object of the invention to provide a service device for maintenance of solar panel arrangements and a method for cleaning an inclined surface of a solar panel arrangement which is flexible in use and which allows removal of large amounts of dirt and/or snow.

It is a further object of the invention to provide an easy and effective maintenance of solar panel arrangements.

It is a still further object of the invention to provide a maintenance tool for cleaning solar panels that can easily be used for large solar plants and the like necessitating few or no assembly effort.

It is a still further object of the invention to provide a servicing device appropriate for substantially automated cleaning of large surfaces of solar aligned panels.

These and other objects are achieved according to a first aspect of the invention by a service device for maintenance of a solar panel arrangement, comprising a service unit for maintenance of at least one surface of the solar panel arrangement, a guiding unit for guiding the service unit with respect to the solar panel arrangement, the guiding unit being configured for direct engagement with an edge of the solar panel arrangement, and a driving unit for moving the service unit with respect to the solar panel arrangement, wherein the service unit comprises a first engagement section and a second engagement section, wherein the guiding unit is attachable to the first engagement section, wherein the driving unit is attachable to the second engagement section, and wherein the second engagement section is displaceable with respect to the first engagement section by the driving unit.

These and other objects are achieved according to a second aspect of the invention by a solar panel service apparatus for maintenance of substantially solar aligned surfaces of a plurality of a solar panels, comprising a service unit for maintenance of a solar aligned surface of at least one of the plurality of solar panels, a guiding unit for guiding the service unit along an edge of the solar aligned surface, the guiding contacting said edge, and a first driving unit for moving the service unit with respect to the solar aligned surface, wherein the service unit comprises a first engagement portion and a second engagement portion, the first engagement portion and the second engagement being substantially arranged at opposite ends of the service unit, wherein the guiding unit is attached to the first engagement portion, wherein the first driving unit is attached to the second engagement portion, wherein the guiding unit comprises a second driving unit for moving the service unit with respect to the solar aligned surface, and wherein the first driving unit and the second driving unit are driven independently from each other such that the service unit may change its orientation.

These and other objects are achieved according to a further aspect of the invention by a service device for maintenance of an inclined surface of a solar panel arrangement, comprising a service unit having a lower portion with a drive unit and an upper portion with a guide unit, wherein the guide unit is configured to engage an upper edge of one of a solar panel and a solar panel frame of the solar panel arrangement such that the upper edge defines a direction of motion of the service unit, wherein the drive unit is configured to displace the lower portion of the service unit with respect to the surface of the solar panel in order to adjust an angle between the service unit and the direction of motion of the service unit, and wherein the drive unit is driving the service unit in the defined direction of motion in such a way that the displacement of the upper portion and the displacement of the lower portion of the service unit with respect to the direction of motion is maintained.

These and other objects are achieved according to a further aspect of the invention by a service device for cleaning at least one surface surface of a solar panel arrangement, comprising a service unit comprising at least one cleaning unit for cleaning at least a region of the at least one surface, a guiding unit for guiding the service unit with respect to the solar panel arrangement, the guiding unit being configured to be supported on an edge of the solar panel arrangement, and a driving unit for moving the service unit with respect to the solar panel arrangement, wherein the guiding unit is attached to a first engagement section of the service unit, wherein the driving unit is attached to a second engagement section of the service unit, and wherein the at least one cleaning unit is arranged between the first engagement section and the second engagement section.

These and other objects are achieved according to a further aspect of the invention by a method for cleaning an inclined surface of a solar panel arrangement, comprising the steps of (1) engaging an upper section of a service unit with an upper edge of one of a solar panel and a solar panel frame of the solar panel arrangement such that the upper edge defines a direction of motion of the service unit, (2) displacing a lower section of the service unit with respect to the surface of the solar panel in order to adjust an angle between the service unit and the direction of motion of the service unit, and (3) driving the service unit in the defined direction of motion in such a way that the displacement of the upper section and the lower section of the service unit with respect to the direction of motion is maintained.

Due to the configuration of the guiding unit to be directly engaged with an edge of the solar panel arrangement, the service device is connectable to any type of solar panel arrangement without the need to provide guiding rails or the like for supporting the service device. Preferably, the service device is mounted onto the solar panel arrangement by simply latching the guiding unit into the edge of the solar panel arrangement. This advantageously allows for mounting the service device at any arbitrary position of the solar panel arrangement, greatly simplifying the mounting procedure as compared to conventional service devices. It further allows use of the service device with a large number of solar panel arrangements by simply dismounting the service device from a first solar panel arrangement by unlatching the guiding unit and remounting the service device to a second solar panel arrangement by latching the guiding unit to an edge of the second arrangement. Preferably, the edge of the solar panel arrangement is formed by an upper edge of at least one of the solar panels. In the context of this application, the terms "upper" and "lower" refer to the direction of gravity. Given a typical inclination of the solar panel surfaces with respect to the horizontal, the engagement of the guiding section with an upper edge of the solar panel arrangements provides a proper support for the service device. For directly engaging the edge of the solar panel, the panel may be of framed or frameless type. It must be understood that the edge of the solar panel arrangement may also be formed by a suited part of a supporting structure of the solar panel arrangement.

The first engagement section and the second engagement section of the service unit are advantageously both located at respective ends of the service unit, such that the ends of the service unit are supported by the guiding unit and the driving unit respectively.

Displacement of the second engagement section of the service unit with respect to the first engagement section of the service unit advantageously allows for alignment of the service unit with respect to the solar panel arrangement and a direction of movement of the service device. Particularly for cleaning the solar panel surface from large amounts of pollutants like snow, it is useful to align the service unit at an angle with respect to the plumb line, such that detached snow may directly fall off the panel surface due to gravity. Furthermore, an angled alignment of the service unit simplifies the passage of the service device from one solar panel to a neighbouring solar panel, since the guiding unit and the driving unit are accordingly displaced with respect to the edges of the panels.

Preferably, the guiding unit comprises driving means for moving the service unit with respect to the solar panel arrangement. This allows for reliable transport of the service device with respect to the solar panel arrangement and adjustment of the service unit alignment, since the engagement sections of the service unit are respectively moveable by the driving unit and the guiding unit independently. Alternatively, the guiding unit comprises means for fixing the position of the guiding unit with respect to the solar panel arrangement. In this configuration, a relative displacement of guiding unit and driving unit may be adjusted by fixing the guiding unit and moving the driving unit, while a movement of the service device is achieved by fixing an attachment angle between the guiding unit and the service unit and moving the driving unit.

Expediently, at least one of the guiding units and driving units comprises means for measuring a relative displacement of the first engagement section and the second engagement section with respect to a direction of motion of the service unit, allowing control of the alignment of the service unit during movement of the service device.

In a preferred embodiment, the means for measuring the relative displacement comprise means for measuring an attachment angle between the service unit and the at least one of the guiding units and the driving units. The means for measuring the attachment angle may in particular comprise a Hall sensor.

Preferably, the service unit comprises at least one service element selected from the group comprising a brush being rotatable with respect to the surface of the solar panel arrangement, a brush being fixed with respect to the surface of the solar panel arrangement, a wiper engaging the surface of the solar panel arrangement, a snow plough, a cleaning agent applicator, a sprinkling unit, a washing unit, a rubbing unit, a suction unit for removing residual water and/or cleaning agents, a polishing unit, an optical and/or electronic reader device and an optical sensor for inspection of the solar panel arrangement. The rotating and/or fixed brushes and the wiper are especially useful for detaching and removing dirt from the solar panel surface. Additionally, a snow plough service element provides the possibility to remove large masses of snow or other heavy pollutants. The cleaning agent applicator for applying water and/or chemical and/or biological cleaning supplies further enhances cleaning of the solar panel surfaces. Sprinkling units, washing units and/or rubbing units may be used sole or in combination to execute different cleaning tasks in varying intensity. Expediently, a suction unit for removing residual water and/or cleaning agents is used for removal of residual fluids and the comprised pollutants therein as well as for drying the cleaned surface. The polishing unit is useful for polishing the solar panel surfaces, thus enhancing the production of electrical energy and/or allowing for the application of long-lasting coatings to the panel surfaces. The optical and/or electronic reader device may be used inter alia to identify individual solar panels by reading information being printed or otherwise embedded on the solar panel surface. The optical sensor for inspection of the solar panel arrangement may be used to identify mechanical and/or electrical defects of the solar panels. Combined with the optical and/or electrical reader device, individual maintenance information for each solar panel may be computed and stored for further review in the service device.

Advantageously, the service device may comprise at least one further service unit. In advantage, the service devices combine two or more of the above mentioned service elements to accomplish two or more maintenance functions in a single working step.

In a preferred embodiment, the guiding unit comprises guiding wheels engaging the edge of the solar panel arrangement and traction means for engaging the surface of the solar panel arrangement. The traction means may comprise driving wheels, driving belts, driving chains and the like. Preferably, the weight of the service device is partly born by the guiding wheels and partly born by the traction means and the driving unit.

Preferably, the service device further comprises a control system being configured to adjust a relative displacement of the first engagement section and the second engagement section of the service unit with respect to a direction of motion of the service unit.

Expediently, the surface of the solar panel arrangement may be inclined with respect to the horizontal.

According to the invention, the method for cleaning an inclined surface of a solar panel arrangement comprises the steps of engaging an upper section of a service unit with an upper edge of a solar panel or a solar panel frame of the solar panel arrangement such that the upper edges define a direction of motion of the service unit, displacing a lower section of the service unit with respect to the surface of the solar panel in order to adjust an angle between the service unit and the direction of motion of the service unit, and driving the service unit in the defined direction of motion in such a way that the displacement of the upper section and the lower section of the service unit with respect to the direction of motion is maintained. This method allows for reliable cleaning of solar panel surfaces by dropping detached pollutants directly to the ground as well as achieving exact alignment of the service unit with respect to solar panel edges in particular for inspection purposes.

Expediently, the angle between the service unit and the direction of motion is adjusted such that deposits on the surface are pushed at least partially into the direction of gravity.

Advantageously, the service device is controlled in such a way that during motion no part of the service device comes into physical contact with the rear of the solar panels. By this, damage to the sensitive rear of the solar panels is safely avoided.

According to a first preferred embodiment of the method, driving of the service unit is remotely controlled. According to a second, alternative embodiment of the method, driving of the service unit is autonomously controlled.

Further advantages and features of the invention will become more apparent from a detailed consideration of the exemplary embodiments described hereinafter.

Three preferred exemplary embodiments of a service device according to the invention are described hereinafter and explained in more detail with reference to the attached drawings.

DETAILED DESCRIPTION

Figure 1:
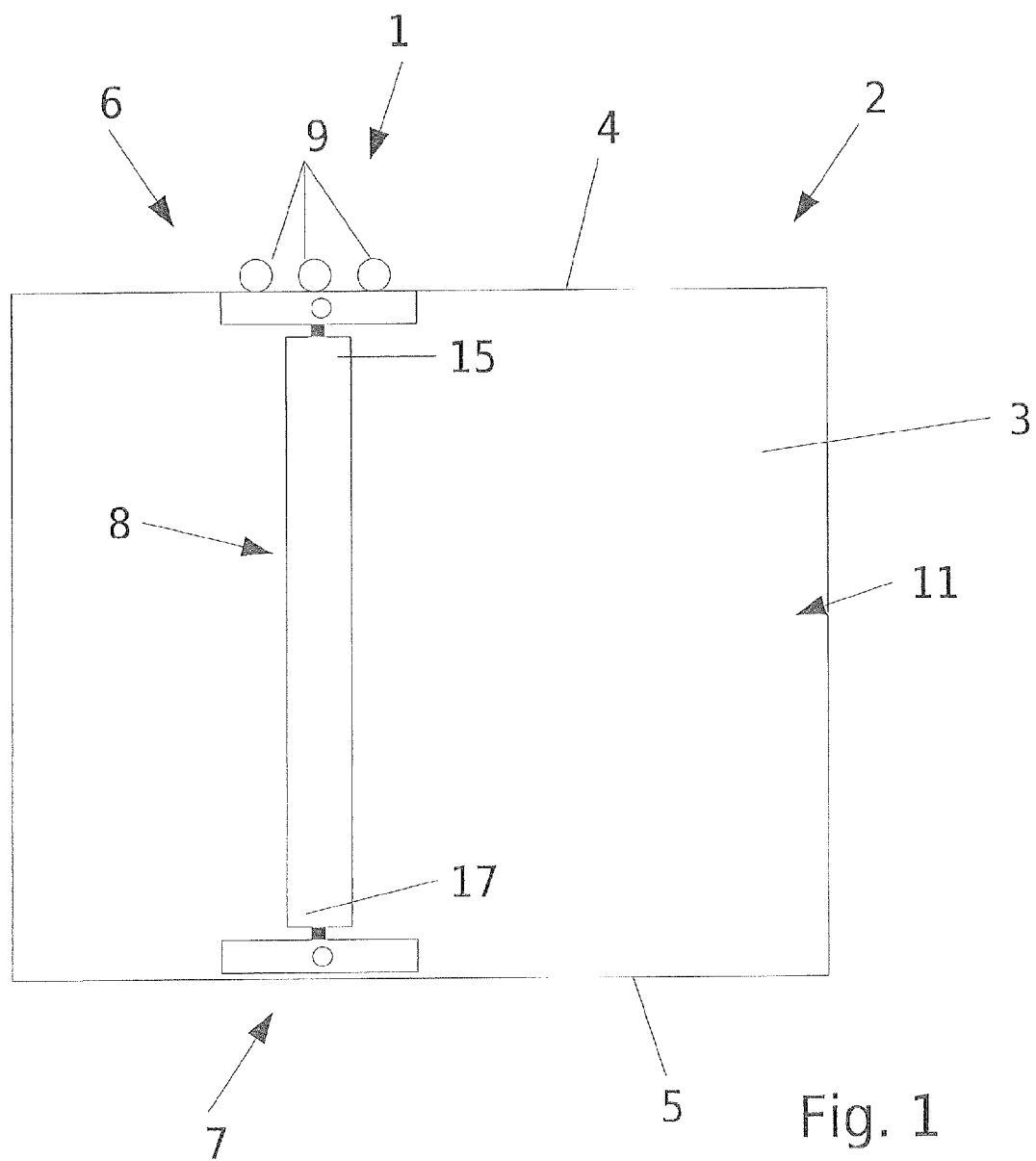
FIG. 1 shows a schematic view of a first embodiment of a service device according to the invention.
Figure 2:
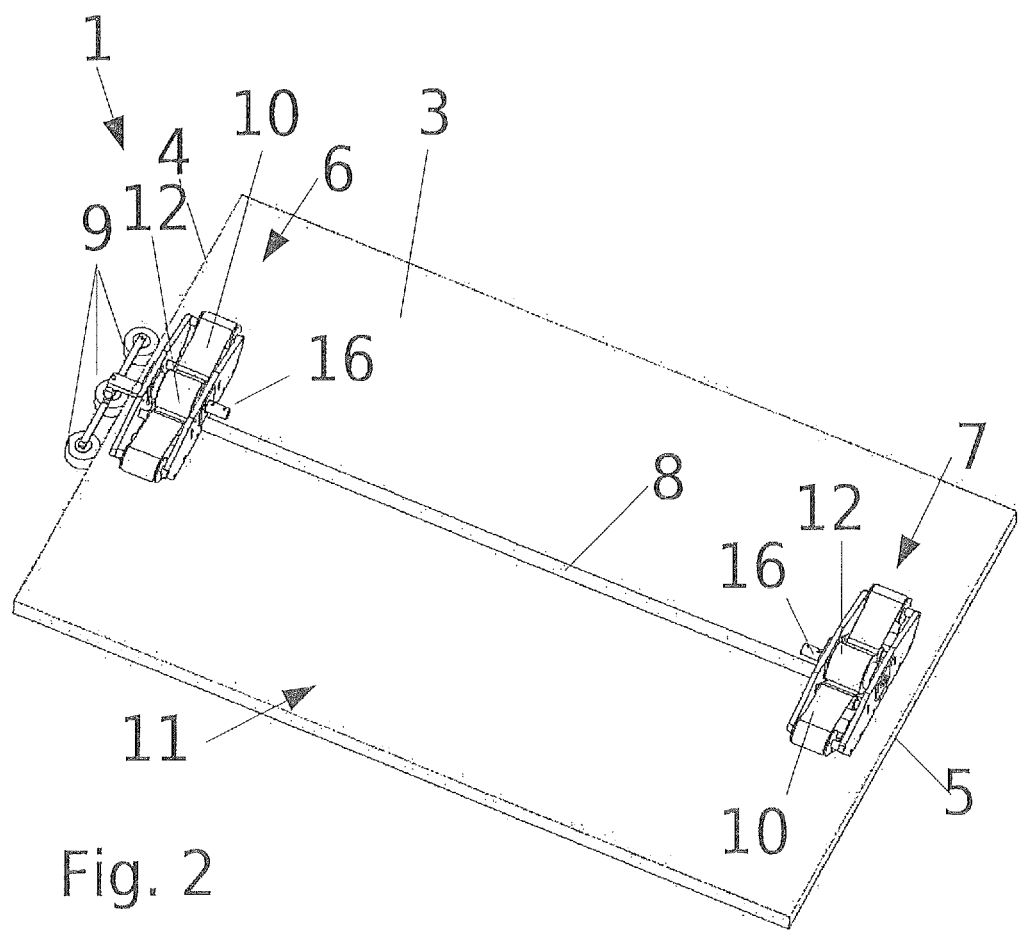
FIG. 2 shows a perspective view of the service device of FIG. 1.
Figure 3:
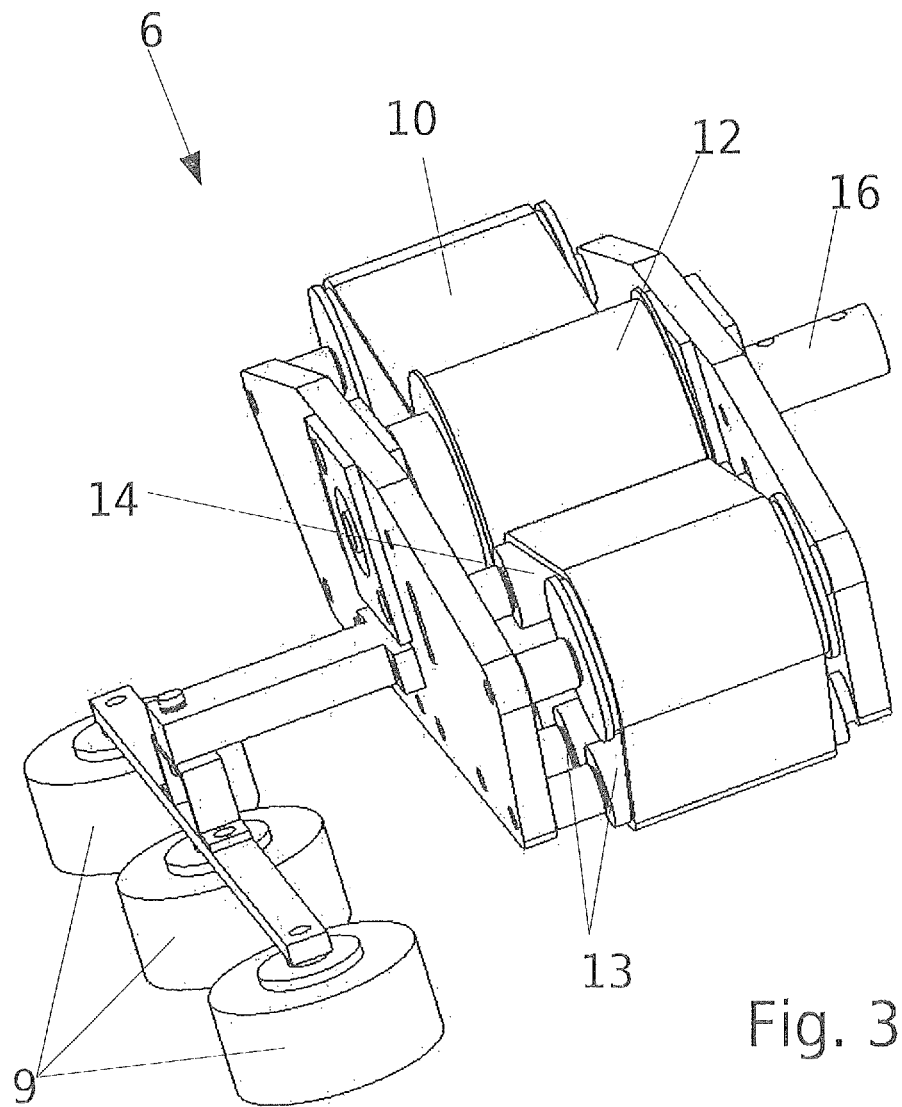
FIG. 3 shows a detailed view of a guiding unit of the service device of FIG. 1.

FIGS. 1-3 show a first embodiment of a service device 1 for maintenance of a solar panel arrangement 2. The solar panel arrangement 2 comprises solar panels 3, which are mounted on a supporting carrier (not shown). A large number of solar panels (of which only a first solar panel 3 is shown in FIG. 1 and FIG. 2) are arranged in a row-like manner in the horizontal direction to form the solar panel arrangement 2. Usually, several of such rows of solar panels form a solar power plant. Each of the solar panels 3 comprises a large number of solar cells for conversion of solar energy into electrical energy, said solar cells being located on an upward facing surface 11 of the solar panel 3. The solar panel 3 is arranged in such a way, that the surface of solar panel 3 is inclined with respect to a horizontal plane. Accordingly, solar panel 3 comprises (with respect to the plumb line) an upper edge 4 and a lower edge 5.

The service device 1 comprises a guiding unit 6, a driving unit 7 and a service unit 8 being configured as a rotatable cleaning brush (as can be seen best in FIG. 1; in FIG. 2, service unit 8 is shown only schematically). The guiding unit 6 is engaged with the upper edge 5 of the solar panel 3 and comprises a set of three guiding rollers 9 being supported by a side surface of the upper edge 5 and a traction belt 10 being supported by the upward facing surface 11 of the solar panel 3. Due to the inclination of solar panel 3 with respect to the horizontal, the guiding rollers 9 and traction belt 10 respectively bear partly the weight of guiding unit 6 and service unit 8. The guiding unit 6 further comprises a gear and driving system 12 for driving traction belt 10, a plurality of driving rollers 13 supporting traction belt 10 and a tensioning adjustment 14 being configured to adjust a tensioning of traction belt 10. By operating the gear and driving system 12, a circulation of traction belt 10 around the driving rollers 13 is drivable. Thereby, guiding unit 6 can be selectively moved in one of the two directions parallel to the upper edge 4 of the solar panel 3. In this process, the movement of guiding unit 6 is guided by the guiding rollers 9. Although the embodiment of the guiding unit 6 shown in FIG. 1 and FIG. 2 comprises a set of three guiding rollers 9, it must be understood that any other suited configuration of guiding rollers and/or any other suited kind of guiding members like e.g. rolling members, sliding members and the like may be used to support the guiding unit 6 on a side surface and/or up facing surface of the solar panel 3.

A first engagement section 15 located at a first end of the service unit 8 is pivotably connected to the guiding unit 6. The guiding unit 6 comprises a prime mover 16, which is connected to a corresponding receiving element located at the service unit 8. Service unit 8 as shown in FIG. 1 is configured as a rotational brush, wherein a rotational movement of the brush is driveable by prime mover 16. Depending on the kind of service unit connected to the guiding unit 6, different sequences of motion for driving the service unit may be passed from the prime mover 16 to the service unit 8. By operating the gear and driving system 12, driving unit 7 can be selectively moved in a direction parallel to the upper edge 4 and the lower edge 5 of the solar panel 3. The trajectory of driving unit 8 is thereby positively controlled by the service unit 8 and guiding unit 6.

A second engagement section 17 of service unit 8, located at a second end of service unit 8, is pivotably connected to the driving unit 7. Driving unit 7 is constructed in a way structurally comparable to guiding unit 6, but does not comprise guiding rollers. Accordingly, driving unit 7 comprises a traction belt 10, a gear and driving system 12, a plurality of driving rollers 13 supporting traction belt 10, a tensioning adjustment 14 and a prime mover 16 being connected to service unit 8.

Both the guiding unit 6 and the driving unit 7 comprise a measuring apparatus (not shown) for measuring the attachment angle between the service device 8 and the guiding unit 6 and the driving unit 7 respectively. The measuring apparatus comprises a Hall sensor for detecting the relative position of service device 8 and guiding unit 6 and driving unit 7 respectively, although it has to be understood that every suitable measuring apparatus for measuring the orientation of the service unit 8 may be used. It further has to be understood that the measuring apparatus used may be configured to measure either one or both of the attachment angles between the service device 8 and the guiding unit 6 and the driving unit 7 respectively. The service device 1 further comprises a control device for controlling movement of the guiding unit 6 and the driving unit 7 independently. Inter alia, the measured attachment angle between the service unit 8 and guiding unit 6 is used as an input signal for operating service device 1. The control device may be configured to operate service device 1 autonomously or remotely controlled.

The service device 1 may be operated in the following way:

In order to clean solar panels 3 of the solar panel arrangement 2, a service unit 8 configured as a cleaning unit (e.g. the rotatable brush as described above) is connected to the guiding unit 6 and the driving unit 7 in order to form the service device 1. Afterwards, the service device 1 is mounted on the solar panel 3 by engaging guiding unit 6 to the upper edge 4 of solar panel 3. By selectively moving the guiding unit 6 and/or the driving unit 7, the orientation of the service device 8 is adjusted. For example, for cleaning the surface 11 of solar panel 3, an orientation of service device 8 perpendicularly to the upper edge 4 of solar panel 3 may be selected. Afterwards, by constantly driving the guiding unit 6 and driving unit 7, service unit 8 is moved in a direction parallel to the upper edge 4 of solar panel 3, sweeping over the surface 11 of solar panel 3. Thereby, the overall movement of the service device 1 is guided by the cooperation of the guiding rollers 9 of guiding unit 6 and the upper edge 4 of solar panel 3. In case of large amounts of dirt, snow or the like being deposited on the surface 11, the orientation of the service unit 8 is changed: in this case, driving unit 7 is displaced backwardly with respect to guiding unit 6, such that the angle between the upper edge 4 of solar panel 3 and the service unit 8 opened in the direction of travel is larger than 90 degrees. Thereby, pollutions of the surface 11 lifted off by the service unit 8 are not only moved into the direction of travel of the service device 1, but also—accelerated by gravity—additionally moved towards the lower edge 4 of solar panel 3. In order to optimize the cleaning result, the orientation of the service device 8 is maintained during the complete cleaning operation. After cleaning of the solar panel surface, the service device 1 is lifted off from the solar panel arrangement 2 and may be transported to another solar panel arrangement to continue cleaning. Alternatively, the service unit 8 may be replaced by a different service unit, e.g. an optical sensor unit, for further maintenance of the solar panel arrangement 2 such as inspection for mechanical and/or electrical defects.

Figure 4:
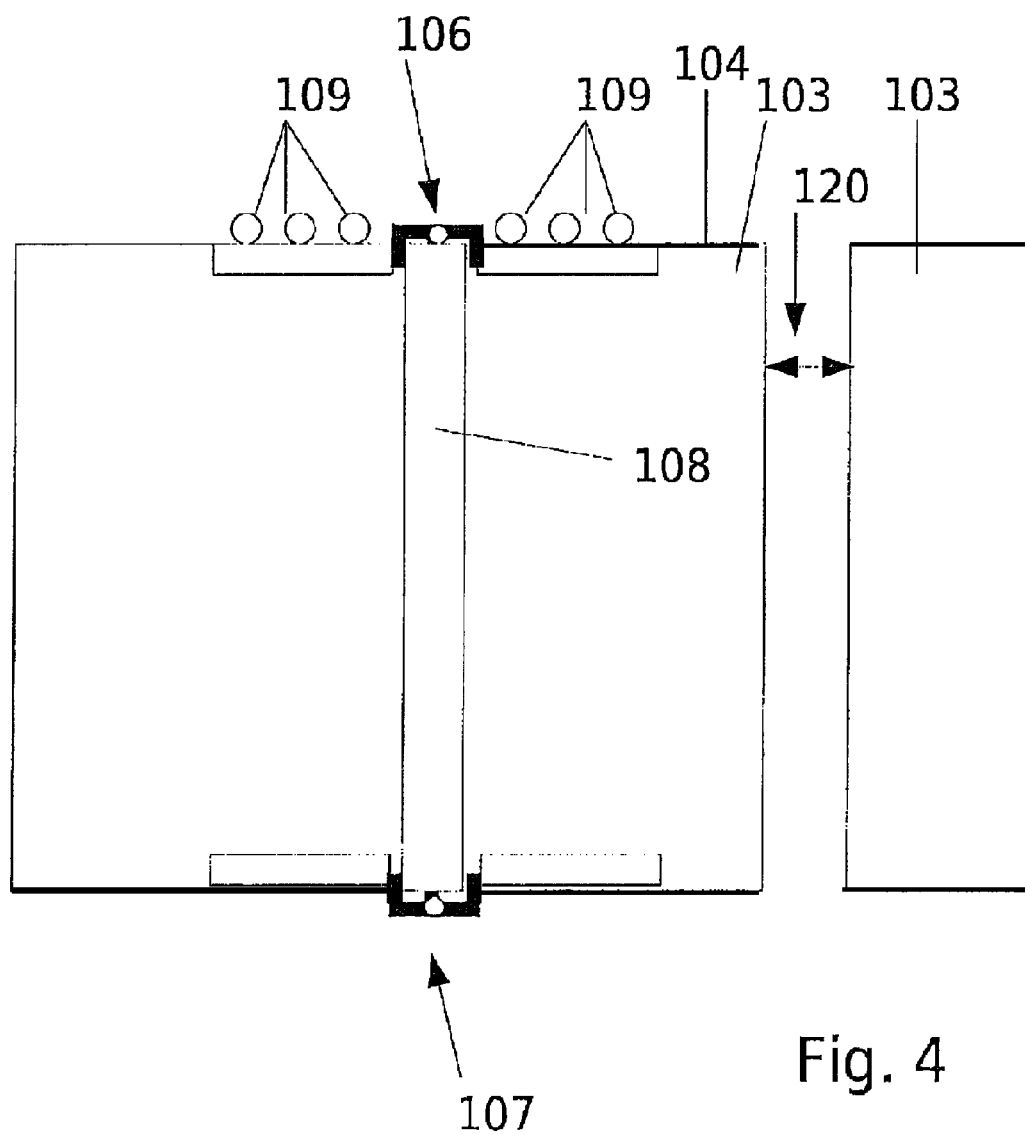
FIG. 4 shows a schematic view of a second embodiment of a service device according to the invention.
Figure 5:
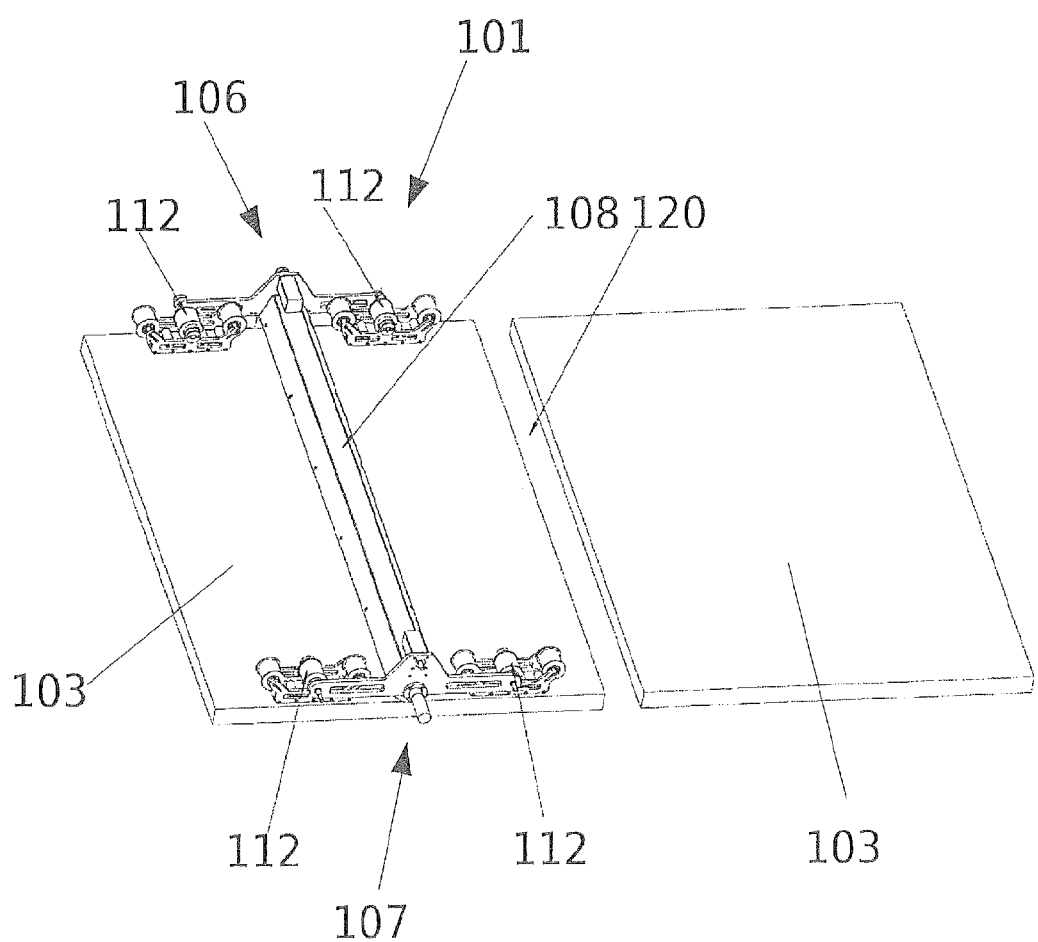
FIG. 5 shows a perspective view of the service device of FIG. 4.

FIGS. 4 and 5 show a second embodiment of a service device 101 for maintenance of a solar panel arrangement 102. Compared to the first embodiment shown in FIGS. 1-3, reference numbers of analogue parts or equivalently working parts are incremented by 100.

Compared to the first embodiment, the guiding unit 106 of the service device 101 according to the second embodiment comprises two sets of guiding rollers 109 and two sets of driving apparatus, i.e. two traction belts (not shown in FIG. 5) and two gear and driving systems 112. Likewise, the driving unit 107 comprises two driving apparatus. Therefore, the guiding unit 106 and the driving unit 107 respectively offer a much longer extension into their direction of motion. Particularly, the respective extension of the guiding unit 106 and the driving unit 107 is large compared to a gap 120 between neighbouring solar panels 103 of the solar panel arrangement 102. Therefore, a safe passage of the service device 101 from one solar panel 103 to a neighbouring solar panel 103 is easily enabled.

As can best be seen from FIG. 5, the service unit 108 of the service device 101 according to the second embodiment is designed as an optical sensor for scanning the surface of solar panels 3. However, it has to be understood that the service unit 108 may be replaced by any other suitable service unit, e.g. a cleaning brush, a wiper, a snow plough, a cleaning agent applicator, a polishing unit or an optical and/or electronic reader device. Again, an optimal alignment of the service unit 108 with respect to the direction of motion may be obtained by adjusting a displacement between the guiding unit 106 and the driving unit 107.

Figure 6:
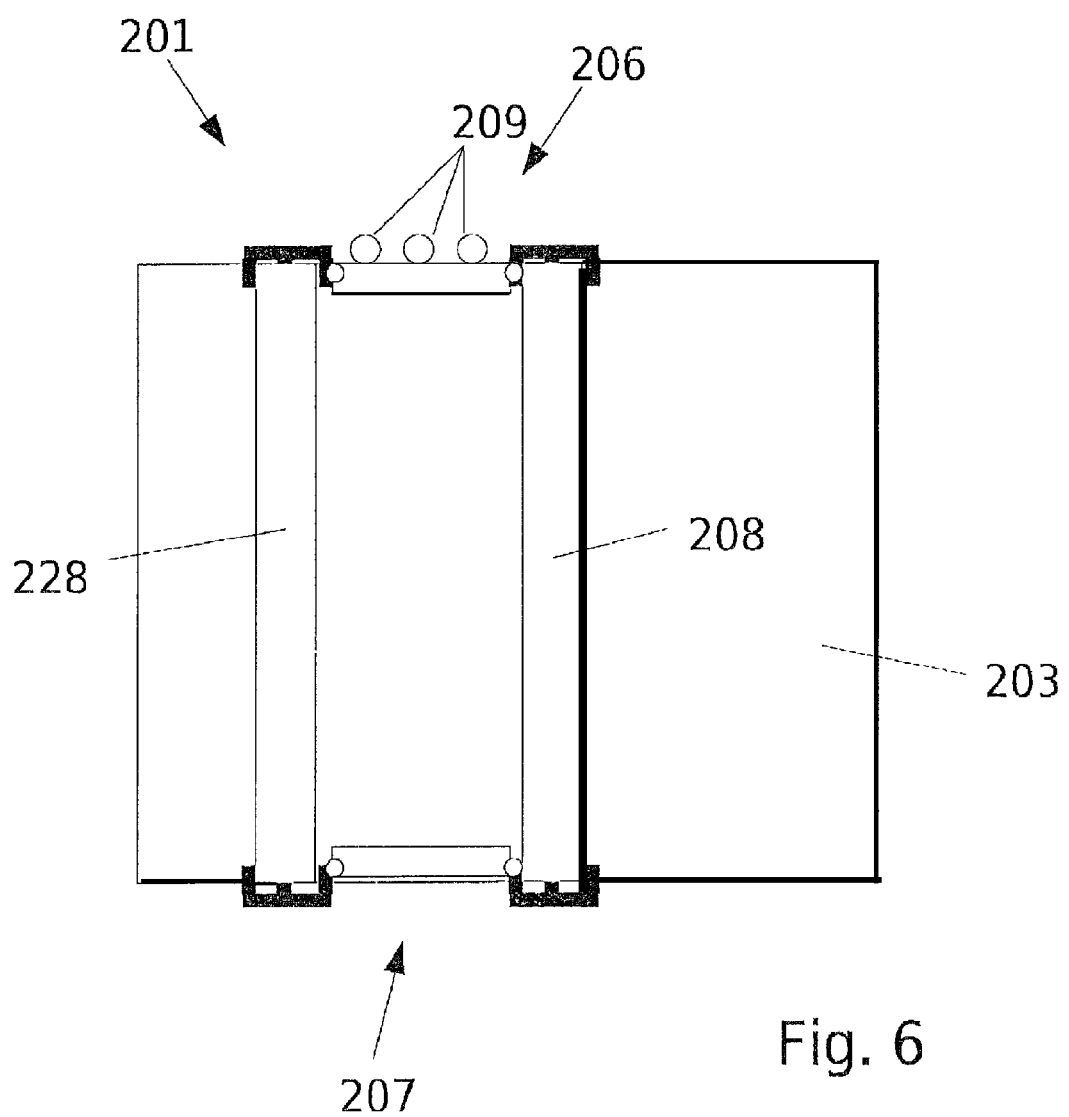
FIG. 6 shows a schematic view of a third embodiment of a service device according to the invention.

FIG. 6 shows a third embodiment of a service device 201 for maintenance of a solar panel arrangement 202. Compared to the first embodiment shown in FIGS. 1-3, reference numbers of analogue parts or equivalently working parts are incremented by 200.

The service device 201 comprises an additional service unit 228, such that supplemental maintenance functions may be accomplished within one work step, i.e. one passage of the service device 201 over the solar panel arrangement 202. The service units 208, 228 may be chosen to complement each other, e.g. by choosing a brushing unit and a cleaning agent applicator, or may be chosen to obtain different tasks in one working step. Again, an optimal alignment of the service units 208 and 228 with respect to the direction of motion may be obtained by adjusting a displacement between the guiding unit 206 and the driving unit 207.

It has to be understood that the above described constructional elements of the service device may be combined not only in the described way, but in many more ways being apparent to a person skilled in the art. In particular, a service device may comprise a multitude of guiding units and/or driving units and/or service units. For example, for building up a service device spanning a large vertical distance, a first service unit may be engaged with a guiding unit at its upper end and with a first, intermediate driving unit at its lower end. Afterwards, a second service unit is engaged at its upper end with the first, intermediate driving unit and at its lower end with a second, lower driving unit.

What is claimed is:

1. A service device for maintenance of a solar panel arrangement, comprising
   a service unit for maintenance of at least one surface of the solar panel arrangement,
   a guiding unit for guiding the service unit with respect to the solar panel arrangement, the guiding unit being configured for direct engagement with an edge of the solar panel arrangement, and
   a driving unit for moving the service unit with respect to the solar panel arrangement,
   wherein the service unit comprises a first engagement section and a second engagement section,
   wherein the guiding unit is attachable to the first engagement section,
   wherein the driving unit is attachable to the second engagement section, and
   wherein the second engagement section is displaceable with respect to the first engagement section by the driving unit.

2. The service device as claimed in claim 1, wherein the guiding unit comprises a drive for moving the service unit with respect to the solar panel arrangement.

3. The service device as claimed in claim 1, wherein at least one of the guiding unit and the driving unit comprises a detector for measuring a relative displacement of the first engagement section and the second engagement section with respect to a direction of motion of the service unit.

4. The service device as claimed in claim 3, wherein the detector for measuring the relative displacement comprises a detector for measuring an attachment angle between the service unit and the at least one of the guiding unit and the driving unit.

5. The service device as claimed in claim 1, wherein the service unit comprises at least one service element selected from the group comprising a brush being drivably rotatable with respect to the surface of the solar panel arrangement, a brush being fixed with respect to the surface of the solar panel arrangement, a wiper engaging the surface of the solar panel arrangement, a snow plough, a cleaning agent applicator, a sprinkling unit, a washing unit, a rubbing unit, a suction unit for removing residual water and cleaning agents, a polishing unit, an optical reader device, an electronic reader device and an optical sensor for inspection of the solar panel arrangement.

6. The service device as claimed in claim 1, further comprising at least one further service unit.

7. The service device as claimed in claim 6, wherein the at least one further service unit is selected from the group comprising a brush being drivably rotatable with respect to the surface of the solar panel arrangement, a brush being fixed with respect to the surface of the solar panel arrangement, a wiper engaging the surface of the solar panel arrangement, a snow plough, a cleaning agent applicator, a sprinkling unit, a washing unit, a rubbing unit, a suction unit for removing residual water and cleaning agents, a polishing unit, an optical reader device, an electronic reader device and an optical sensor for inspection of the solar panel arrangement.

8. The service device as claimed in claim 1, wherein the guiding unit comprises guiding wheels engaging the edge of the solar panel arrangement and a traction unit engaging the surface of the solar panel arrangement.

9. The service device as claimed in claim 1, further comprising a control system being configured to adjust a relative displacement of the first engagement section and the second engagement section of the service unit with respect to a direction of motion of the service unit.

10. The service device as claimed in claim 1, wherein the surface of the solar panel arrangement is inclined with respect to the horizontal.

11. The service device as claimed in claim 1,
    wherein the guiding unit comprises a second driving unit for moving the service unit with respect to the solar panel arrangement, and
    wherein the driving unit and the second driving unit are driven independently from each other such that the service unit may change its orientation.

12. The service device as claimed in claim 1, wherein the edge defines a direction of motion of the service unit,
    wherein the driving unit is configured to displace the service unit with respect to the surface of the solar panel arrangement in order to adjust an angle between the service unit and the direction of motion of the service unit, and
    wherein the driving unit is further configured to drive the service unit in the defined direction of motion in such a way that a displacement of the guiding unit and the displacement of the service unit with respect to the direction of motion is maintained.

13. The service device as claimed in claim 12, wherein a control system is configured to control at least one of said service unit, said guiding unit and said driving unit.

* * * * *